United States Patent
Price

(10) Patent No.: US 6,577,423 B1
(45) Date of Patent: Jun. 10, 2003

(54) OPTICAL TRANSMISSION SYSTEMS, OPTICAL RECEIVERS, AND RECEIVING METHODS

(75) Inventor: Alistair J. Price, Columbia, MD (US)

(73) Assignee: Corvis Corporation, Columbia, MD (US)

( * ) Notice: Subject to any disclaimer, the term of this patent is extended or adjusted under 35 U.S.C. 154(b) by 0 days.

(21) Appl. No.: 09/398,540

(22) Filed: Sep. 17, 1999

(51) Int. Cl.[7] ............................................... H04B 10/00
(52) U.S. Cl. ........................................ 359/161; 359/181
(58) Field of Search ................................. 359/161, 171, 359/173, 179, 188

(56) References Cited

U.S. PATENT DOCUMENTS

| | | |
|---|---|---|
| 5,212,745 A | 5/1993 | Miller |
| 5,212,746 A | 5/1993 | Miller et al. |
| 5,289,552 A | 2/1994 | Miller et al. |
| 5,343,322 A * | 8/1994 | Pirio et al. .................. 359/173 |
| 5,361,156 A | 11/1994 | Pidgeon |
| 5,375,181 A | 12/1994 | Miller |
| 5,418,637 A | 5/1995 | Kuo |
| 5,425,039 A | 6/1995 | Hsu et al. |
| 5,436,749 A | 7/1995 | Pidgeon, Jr. et al. |
| 5,509,093 A | 4/1996 | Miller et al. |
| 5,563,973 A | 10/1996 | Miller et al. |
| 5,642,215 A * | 6/1997 | Suzuki et al. ................ 359/161 |
| 5,838,437 A | 11/1998 | Miller et al. |
| 6,118,566 A * | 9/2000 | Price ........................... 359/181 |
| 6,317,241 B1 * | 11/2001 | Marcerou ..................... 359/161 |

OTHER PUBLICATIONS

An Optical FDM–Add/Drop Multiplexing Ring Network Utilizing Fiber Fabry–Perot Filters and Optical Circulators by Kazuhiro Oda and Hiromu Toba, pp. 825–828, IEEE Photonics Technology Letters, vol, 5., No. 7, Jul. 1993.

* cited by examiner

Primary Examiner—John Tweel

(57) ABSTRACT

Optical systems of the present invention include an electrical signal distortion compensator configured to electrically distort an electrical signal to offset optical distortion imposed by a Fabry-Perot filter on an optical signal corresponding to the electrical signal. The electrical signal distortion compensator can be used in an optical transmitter to distort the electrical signal prior to optical transmission, or in an optical receiver after optical transmission. The distortion compensation can be performed on a baseband signal or a modulated electrical carrier. Likewise, the distortion compensator can be deployed in combination with an optical receiver, which allows the use of the F-P filter-optical receiver combination with transmitters and receivers that do not include F-P filters or distortion compensators. For example, F-P filter/receivers can be used in receiver terminals or regenerators, at various signal monitoring points including amplifier sites, in add/drop devices, and as an optical spectrum analyzer at the monitoring points and optical nodes.

19 Claims, 7 Drawing Sheets

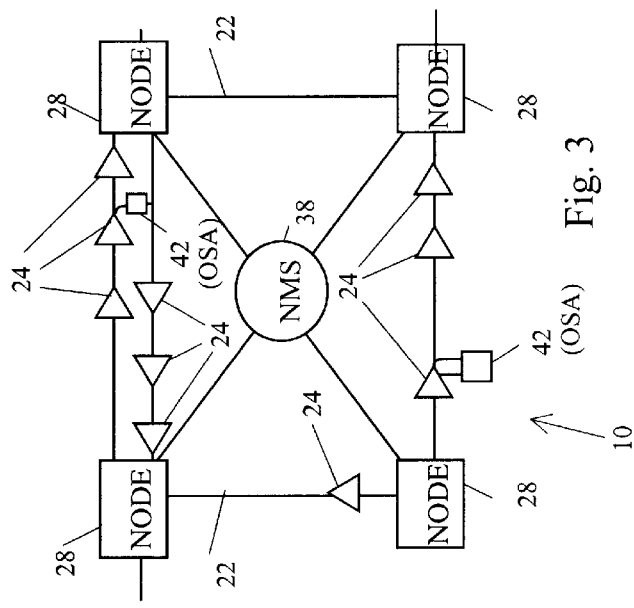
Fig. 3
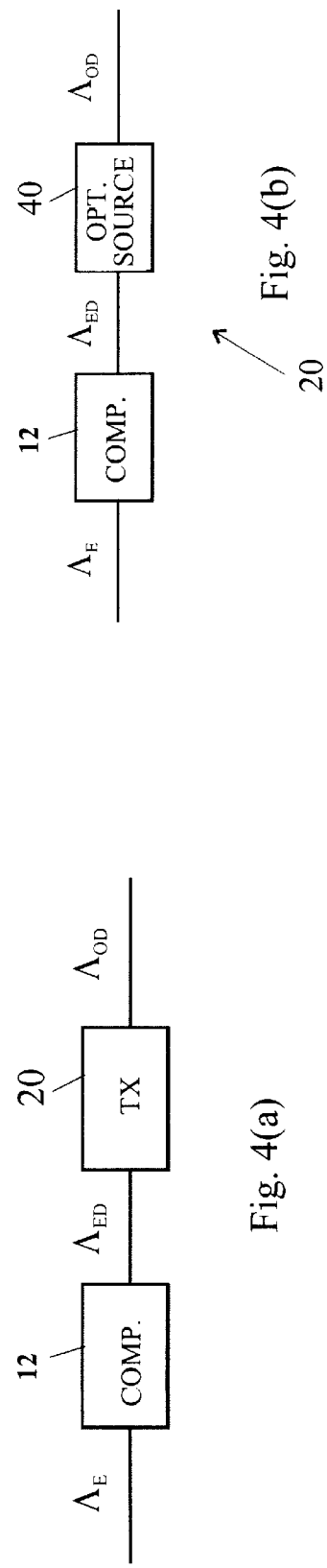
Fig. 4(a)
Fig. 4(b)

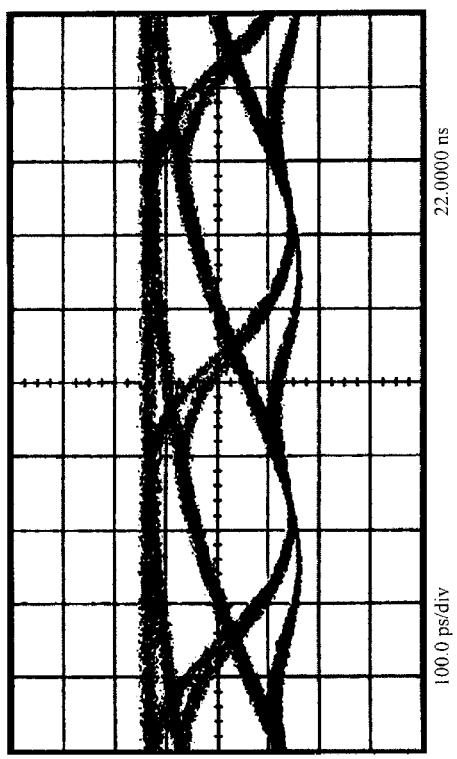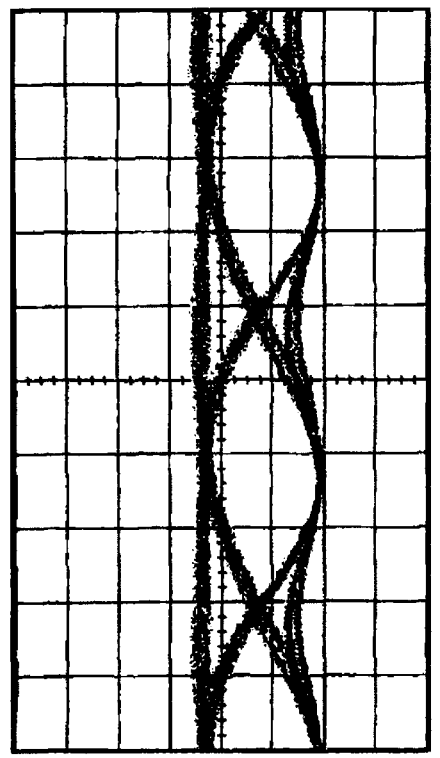

OPTICAL TRANSMISSION SYSTEMS, OPTICAL RECEIVERS, AND RECEIVING METHODS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention is directed generally to communication systems. More particularly, the invention relates to wavelength selection and receiving techniques for use in optical receivers and transmission systems.

The continued development of digital technology has provided electronic access to vast amounts of information. The increased access to information has driven demand for faster and higher capacity electronic information processing equipment (computers) and transmission networks and systems linking the processing equipment (telephone lines, cable television (CATV) systems, local, wide and metropolitan area networks (LAN, WAN, and MAN)).

In response to this demand, communications companies have turned to optical transmission systems to provide substantially larger transmission capacities than traditional electrical communication systems. Early optical transmission systems, known as space division multiplex (SDM) systems, transmitted one information signal using a single wavelength in single waveguide,. i.e. fiber optic strand. Time division multiplexing (TDM) multiple low bit rate, information signals onto a single wavelength in a known sequence that can be separated upon receipt has further increased the transmission capacity of optical systems.

The continued growth in traditional voice, video, and data communications systems and the emergence of the Internet as a means for accessing data has further accelerated the demand for higher capacity transmission systems. Communications service providers, especially long distance telecommunications companies, have looked to wavelength division multiplexing (WDM) to further increase the capacity of their existing systems.

Additional transmission capacity is added to WDM systems by increasing the number of information carrying optical signal wavelengths, or signal channels, used in the system. Generally, unique optical transmitter/receiver pairs operated at fixed transmit/receive wavelengths are deployed to provide additional signal channels in WDM systems. The transmitters and receivers used in the WDM systems are generally the same in construction, except for the wavelength transmitted or received. Different wavelength optical sources or selective devices are provided in the transmitters and corresponding different optical filters or local oscillators are provided in the optical receivers to provide the different signal channels.

In optical systems, one of the more common techniques for selecting individual wavelength signal channels involves the use of grating technology, usually fiber Bragg gratings ("FBG"). Fiber Bragg gratings have proven to be extremely useful wavelength selective devices, because the fiber gratings can be spliced directly into a transmission fiber and used to provide nearly distortion free separation and stabilization of optical signal wavelengths. Also, fiber Bragg gratings can be produced having well controlled reflectivities and reflective bandwidths. These attributes make Bragg gratings very well suited for use as optical filters in optical receivers and wavelength stabilizers in optical transmitters. See U.S. Pat. No. 5,077,816.

A current shortcoming of fiber Bragg gratings is the reflective wavelengths can only be efficiently tuned over a relatively narrow range, typically around 1 nm. It is therefore necessary to provide different fiber Bragg gratings for each different wavelength that must be separated or stabilized in the WDM system.

The need to use different Bragg gratings for each wavelength increases the complexity of manufacturing and maintenance of WDM systems. Whereas, a broadly tunable filter would streamline filter manufacturing by allowing the same device to be manufactured and then tuned to a desired operating wavelength when deployed in WDM systems. Tunable filters can also provide wavelength agility in optical transmitters and receivers, which allows flexible wavelength allocation and network planning and protection in WDM systems.

Another wavelength filtering technique employs Fabry-Perot ("F-P") filters, which can be used to separate wavelengths from the WDM signal. Unlike Bragg gratings, Fabry-Perot filters can be tuned over a relatively wide wavelength range. However, narrow bandwidth F-P filters can introduce unacceptable levels of distortion into the filtered optical signals. As such, narrow bandwidth F-P filters have generally been limited to use in non-signal processing applications, such as in optical spectrum analyzers and other power measurement devices, and laboratory apparatuses and test systems.

The lack of a robust tunable wavelength selection technique constrains current WDM system designs and manufacturing capabilities. It will become increasingly necessary to provide tunable wavelength selection techniques to facilitate continued growth in WDM system capacity and capability. In view of these present constraints, there is a clear need for improved wavelength selection techniques and optical receivers and systems to facilitate the development of higher capacity, longer distance optical communication systems.

SUMMARY OF THE INVENTION

The apparatuses and methods of the present invention address the above need for tunable wavelength selection techniques, optical receivers and optical systems for use therein. Optical systems of the present invention generally include an electrical signal distortion compensator configured to electrically distort an electrical signal to offset optical distortion imposed by a Fabry-Perot filter on an optical signal corresponding to the electrical signal.

The electrical signal distortion compensator can be used in an optical transmitter to distort the electrical signal prior to optical transmission, or in an optical receiver after optical transmission. The distortion compensation can be performed on a baseband signal or a modulated electrical carrier. Likewise, the distortion compensator can be deployed in combination with an optical receiver, which allows the use of the F-P filter-optical receiver combination with transmitters and receivers that do not include F-P filters or distortion compensators.

The distortion compensator can be embodied as group delay equalizer shaped to offset group delay response of the Fabry-Perot filter. The distortion compensator can be used in combination with fixed and tunable F-P filters at various locations along an optical link. For example, F-P filter/receivers can be used in receiver terminals, regenerators, and add/drop devices, at various signal monitoring points including amplifier sites, and as an optical spectrum analyzer at the monitoring points and optical nodes.

Accordingly, the present invention addresses the aforementioned needs for improved wavelength selection techniques, optical receivers, and optical systems to increase the efficiency and capacity of optical components and communication systems without commensurate increases in the cost of optical components. These advantages and others will become apparent from the following detailed description.

BRIEF DESCRIPTION OF THE DRAWINGS

Embodiments of the present invention will now be described, by way of example only, with reference to the accompanying drawings for the purpose of illustrating embodiments only and not for purposes of limiting the same; wherein like members bear like reference numerals and:

FIGS. 2 and 3 show optical system embodiments;

FIGS. 4(a&b) show optical transmitter embodiments;

FIGS. 8(a&b) are detected optical signal eye patterns without and with electronic distortion compensation; and, FIGS. 9(a–d) show exemplary add and/or drop device embodiments.

DETAILED DESCRIPTION OF THE INVENTION

Figure 1A:
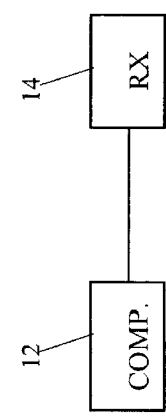
FIGS. 1(a&b) show the distortion compensator and receiver embodiments.
Figure 1B:
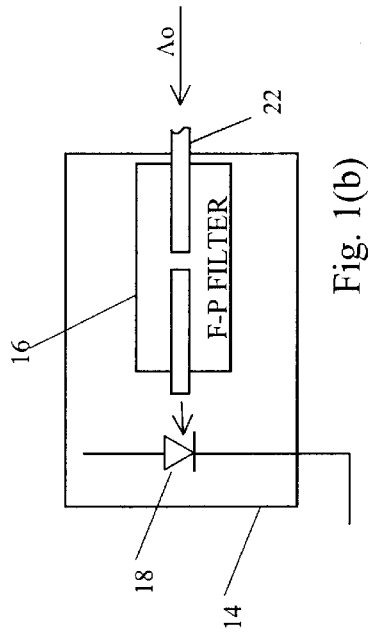

Optical systems 10 of the present invention include an electrical distortion compensator 12 and an optical receiver 14 configured to receive and convert an optical signal into a corresponding electrical signal (FIG. 1(a)). The receiver 14 generally includes a Fabry-Perot filter 16, which is typically a fiber device, configured to selectively pass one or more wavelengths to an optical to electrical converter 18, such as a.photodiode (FIG. 1(b)).

Figure 2:
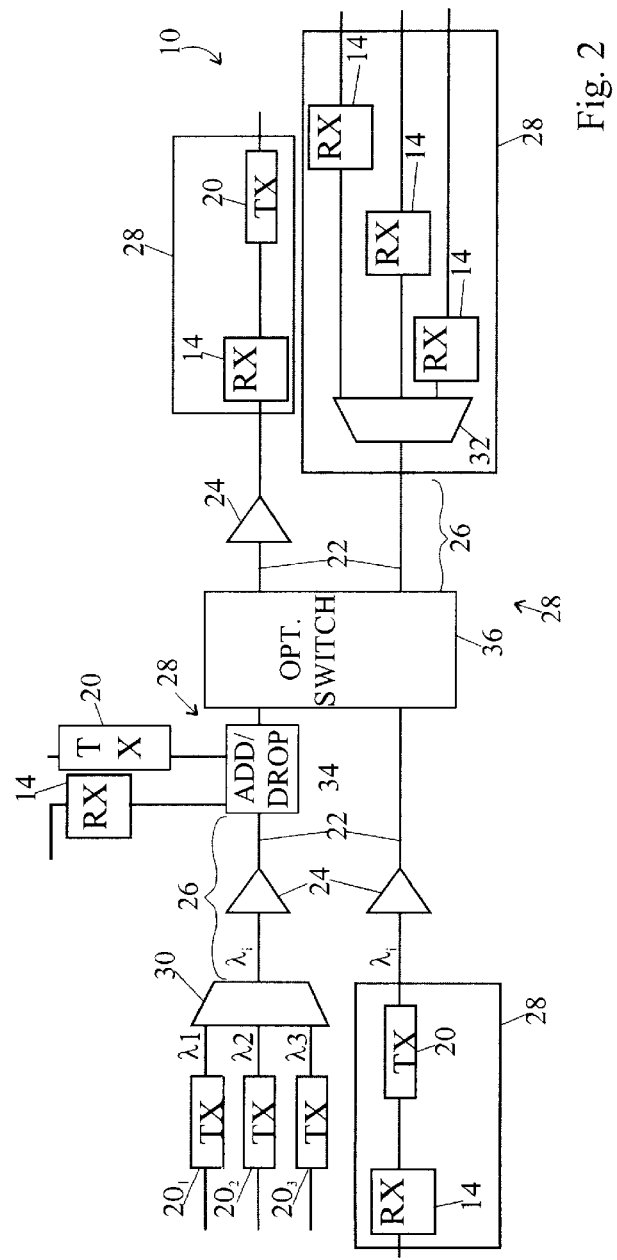

As shown in FIG. 2, the system 10 will also generally include one or more optical transmitters 20 configured to transmit information via one or more information carrying optical signal wavelengths, or signal channels, $\lambda_i$ through an optical fiber 22 to the receiver 14. One or more optical amplifiers 24 may be deployed to optically regenerate attenuated optical signals in optical links 26 between optical nodes 28, which may include transmitters 20 and/or receivers 14.

Wavelength selective and non-selective optical combiners 30 and distributors 32, such as multiplexers, couplers, demultiplexers, and splitters, can be provided to combine signal, channels from multiple transmitters 20 or fibers 22 and distribute signal channels among multiple receivers 14 or fibers 22. The optical nodes 28 may also include other optical components, such as one or more add/drop devices 34 and optical switches 36 interconnecting the transmitters 20 and receivers 14. For example, broadcast and/or wavelength reusable, add/drop devices, and optical and electrical/digital cross connect switches and routers can be deployed in the system 10 as necessary. As shown in FIG. 3, the system 10 can be embodied as a network in which communications traffic is routed in various topologies, i.e., rings, mesh, etc., and controlled by a network management system 38. The transmitters 20 and receivers 14 can interface directly with electrical transmission systems or via electrical or optical switches or interfaces to other optical systems that operate using the same or different wavelengths.

In various embodiments, the signal distortion compensator 12 can be provided before or included in the transmitter 20 and configured to electrically distort the electrical signal before it is imparted onto an optical signal wavelength, FIGS. 4(a) and 4(b), respectively. Distortion compensation can be performed when the electrical signal $\Lambda_E$ is in various baseband formats (i.e., RZ, NRZ, duobinary, and various shift key formats), as well as after the electrical signal is modulated onto an electrical carrier (FIG. 4). The distorted electrical signal $\Lambda_{ED}$ can be imparted onto an optical signal channel $\lambda_i$ by directly or externally modulating an optical source 40, such as a laser, to produce a distorted optical signal $\Lambda_{OD}$. Alternatively, the distorted electrical signal $\Lambda_{ED}$ can be upconverted onto the optical signal channel $\lambda_i$ using an optical source 40 having a different optical wavelength than the signal channel.

Figure 5B:
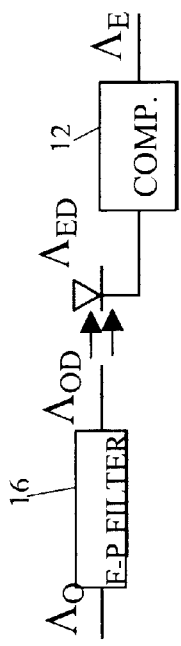
FIGS. 5(a&b) show optical receiver embodiments.
Figure 5A:
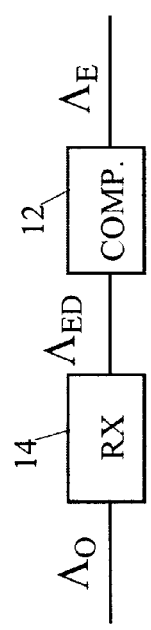

Likewise, the distortion compensator 12 can be used to compensate for optical distortion after an undistorted optical signal $\Lambda_o$ has been filtered using the F-P filter 16. A distorted optical signal $\Lambda_{OD}$ provided by the F-P filter 16 is converted to a distorted electrical signal $\Lambda_{ED}$ by the receiver 14 (FIGS. 5(a&b)). The compensator 12 distorts the distorted electrical signal $\Lambda_{ED}$ to compensate for the optical distortion and produces a distortion compensated electrical signal $\Lambda_E$. The compensator 12 can be configured to provide distortion compensation for both coherently and directly detected optical signals, as will be further discussed below.

Figure 6B:
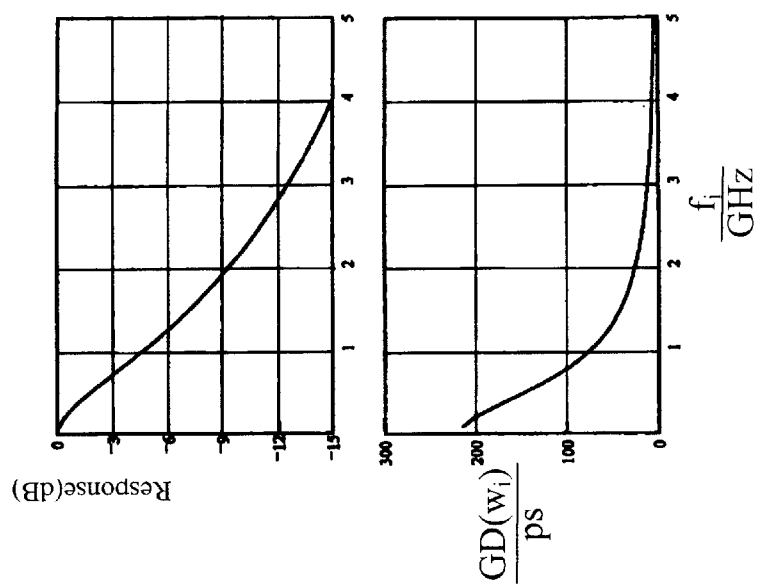
FIGS. 6(a–c) show response and group delay distortion plots for an exemplary filter design, a F-P filter, and an electrical distortion compensator.
Figure 6A:
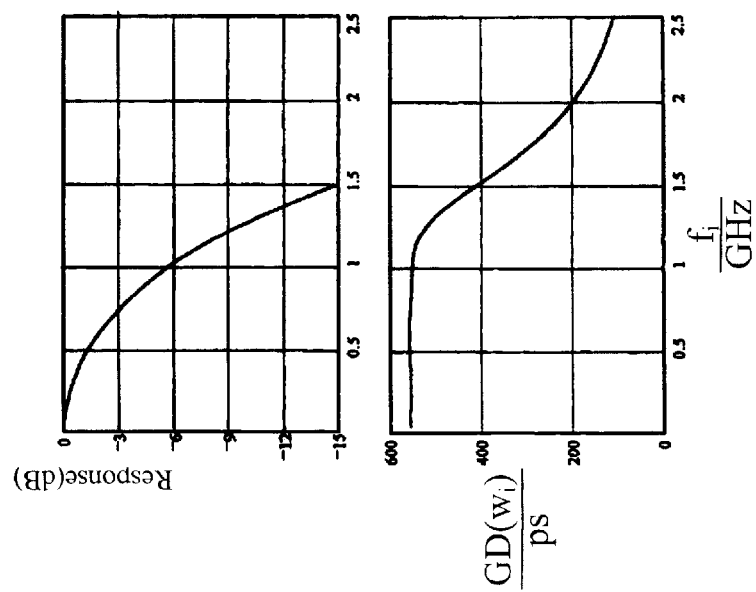
Figure 6C:
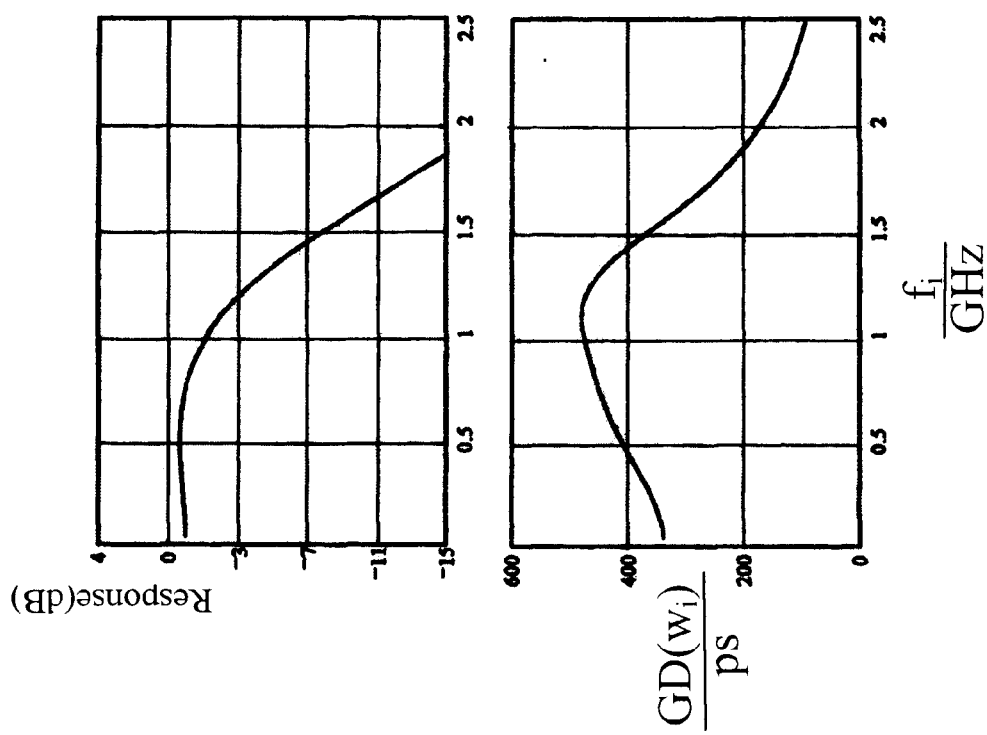
Figure 9B:
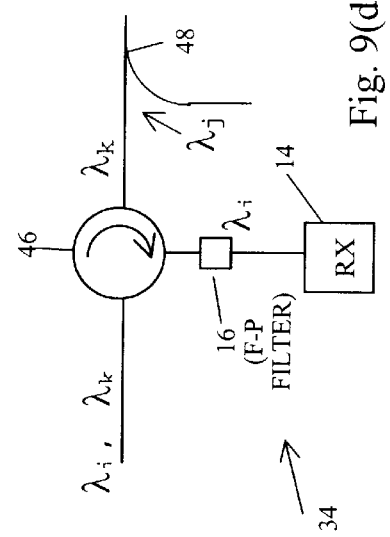
Figure 9A:
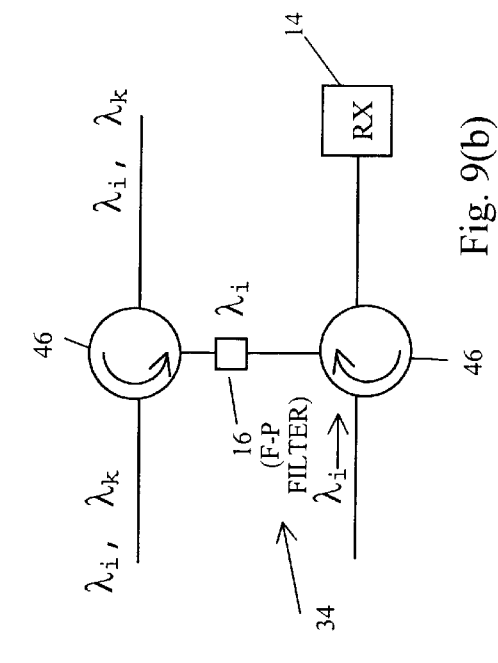
Figure 9D:
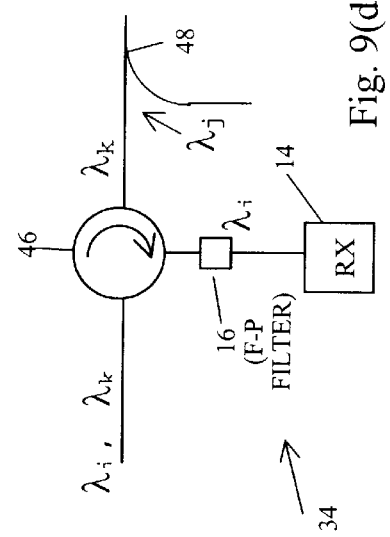
Figure 9C:
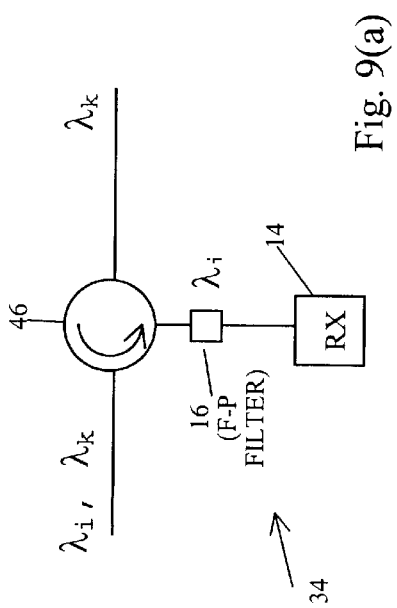

The distortion compensator 12 can be designed to apply various distortion patterns to the electrical signal. FIG. 6(a) shows an example of a linear phase filter having a response, and group delay suitable for use in optical systems. In contrast, a typical response and group delay of a F-P filter 16 is approximately equal to the first pole of the linear phase filter, which is shown in FIG. 6(b). As is shown and observed in practice, the F-P filter 16 group delay response is not constant resulting in signal distortion that often renders the F-P filters unusable for many signal processing applications. However, the distortion compensator 12 of the present-invention are designed to impart a complementary group delay, as shown in FIG. 6(c), to offset the distortion from the F-P filter 16, thereby providing a substantially less distorted and usable signal.

Fabry-Perot filters 16 are generally known in the art, for example, see U.S. Pat. Nos. 5,212,745, 5,212,746, 5,289,552, 5,375,181, 5,25,039, 5,509,093, 5,563,973, and 5,838,437, which are incorporated herein by reference. Both fixed and scanning/tunable wavelength F-P filters are commercially available from various vendors, such as Micron Optics, Inc. of Atlanta, Ga.

Distortion compensators of the present invention can be described by the general equation:

$$Z(s) = sL + 1/(sC)$$

$$L = RQ/(2\pi f_0)$$

$$C = 1/(4\pi^2 f_0^2 L)$$

$$H(s) = PZ \ (Poles, Zeros, s)$$
$$= H \leftarrow 1$$
$$\text{for } j \in 0 \cdots length(Poles) - 1$$
$$H \leftarrow (H^* - (Poles_j 2\pi))/(s - (Poles_j 2\pi))$$
$$\text{for } k \in 0 \cdots length(Zeros) - 1$$
$$H \leftarrow (H^* - (Zeros_k 2\pi))/(s - (Zeros_k 2\pi))$$
$$H$$
$$D(\omega) = -d/d\ \omega(\arg(H(j\omega))),$$

where

| |
|---|
| Z = impedance |
| L = inductance |
| R = resistance |
| C = capacitance |
| $f_0$ = frequency |
| Q = Q factor |
| $D(\omega)$ = group delay |
| $H(s)$ = Transfer function |

Figure 7:
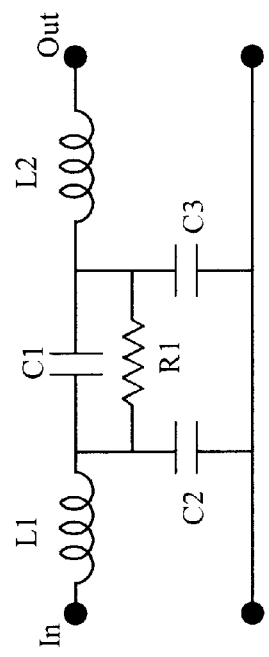
FIG. 7 is an exemplary circuit embodiment of distortion compensators.

An exemplary embodiment of the electrical distortion compensator 12 to compensate for distortion caused by a Fabry-Perot filter is shown in FIG. 7.

Testing was performed to compare the performance of F-P filter 16 in the optical transmission system 10 without and with the distortion compensator 12 of the present invention. An optical signal was generated, transmitted through a span of optical fiber, and filtered using a fiber F-P filter. A broadband receiver was used to detect the optical signal and convert it to an electrical signal. No distortion compensation was performed and the resulting detected signal eye pattern is shown in FIG. 8(*a*).

A pole/zero transfer function analysis was performed to establish the impedance values ($R_1$=5 Ω, $L_1$=$L_2$=7.6 mH, $C_1$=100 pF, $C_2$=$C_3$=2.6 pF) for the circuit shown in FIG. 7 to compensate for the fiber F-P filter. The resulting distortion compensator was used to distort an electrical signal, which was used to generate an optical signal that was transmitted through the optical fiber. The optical signal was filtered using the 2.5 GHz F-P filter and detected using a conventional photodiode optical receiver, i.e., broadband and SONET receivers. The detected eye pattern shown in FIG. 8(*b*) shows a substantial decrease in the signal distortion results from the use of the distortion compensator 12.

In various embodiments, the receivers 14 include tunable F-P filters 16 that are used in combination with tunable transmitters 20 to provide flexibility in wavelength allocation in the optical system 10. In optical systems 10 employing these embodiments, the network management system 38 can be used to set the wavelengths of the tunable transmitters 20 and the F-P filters 16 in the receivers 14 to achieve a desired wavelength provisioning plan for the system 10. The network management system 38 can also be used to groom or reroute communications traffic by tuning the operating wavelength of the transmitter 20 and the F-P filters 16 in the receiver 14 to accommodate changes in traffic patterns or service disruptions in the network.

In other embodiments, receivers 14 with F-P filters 16 are provided at various monitoring points, such as amplifier sites, along the optical fiber 22 path. The F-P filters 16 at the monitoring sites can be set at a fixed wavelength or scanned through at least a portion of the signal channels $\lambda_i$ to provide signal characteristics, i.e., bit error rate, signal to noise ratio, etc., as the signal channels traverse the optical link 26.

When the receivers 14 include the distortion compensator 12 to compensate for distortion following reception, the receiver/compensator can be used in combination with other transmitters and receivers that do not include F-P filters 16 and compensators 12. In addition, it may be desirable to provide distortion compensation following a direct detection receiver, which provides a flexible receiver without the use of a local oscillator. Amplitude compensation in the direct detection configurations can often be sufficient to provide acceptable signal quality without having to account for phase distortion introduced by the F-P filter 16.

It may also be desirable to configure the distortion compensator 12 to compensate for only a portion of the distortion, as in the direct detection embodiment. The present invention can also be effectively implemented with other electrical and optical compensation techniques used in optical systems. For example, the distortion compensator 12 can be further configured to compensate for at least a portion of the optical distortion that occurs as a result of chromatic dispersion and non-linear effects in the fiber.

Receivers 14 with tunable F-P filters 16 can also be deployed as optical spectrum analyzers 42 to provide monitoring data for controlling amplifiers 24 and other optical components, as well as system operations. The monitoring data can also be sent to the network management system 38 via either a system supervisory channel through the optical fiber 22 or the optical nodes 26 or a direct connection using a WAN or other communication network.

The optical spectrum analyzers 42 of the present invention provide not only the usual capabilities of power level detection across the spectrum, but further provides error checking capability at each monitoring point. The ability to detect errors at the various monitoring points allows specific spans between monitoring points to be identified as the source of the errors.

The receivers 14 and F-P filters 16 can be used to provide fixed or tunable add/drop multiplexers 34 as shown in FIG. 9. The F-P filter 16 can be used in combination with one or more directional components, such as circulators 46 and couplers 48, to add and/or drop signal wavelengths in the pass band of the filter 16. For example, the embodiment shown in FIGS. 9*a* can employ a fiber Fabry-Perot filter 16 to transmit a drop wavelength $\lambda_i$ to the receiver 14, while reflecting the remaining wavelength $\lambda_k$. In FIG. 9*b* embodiments, the F-P filter 16 is used to extract the drop wavelength $\lambda_i$, as well as insert add wavelengths at $\lambda_j$. FIGS. 9*c–d* embodiments employ couplers 48 and isolators 50, and circulators 46, respectrively, with the F-P filter 16 to extract the drop wavelength $\lambda_i$ and couplers 48 to add signal wavelengths $\lambda_j$.

In various embodiments, the transmitter 20 is configured to encode the information being transmitted to allow for error correction following reception. Error correction schemes, such as forward error correction, can be implemented to increase the transmission error tolerance of the system 10 and to provide another performance metric for optical spectrum analysis. At the monitoring points, the error correction schemes can track the introduction of errors into each span along the fiber 22 and report the error information to the network management system 38.

The wavelength selection and compensation techniques of the present invention provide increased flexibility and capability in optical systems. The increased flexibility can also help ameliorate component supply problems in WDM systems by providing a common receiver that can be deployed for use over a portion or all of the wavelength range in the WDM system.

Those of ordinary skill in the art will further appreciate that numerous modifications and variations that can be made to specific aspects of the present invention without departing from the scope of the present invention. It is intended that the foregoing specification and the following claims cover such modifications and variations.

What is claimed is:

1. An optical system comprising:
    at least one transmitter configured to transmit information carried by at least one electrical signal via at least one optical signal channel;
    at least one receiver including a Fabry-Perot filter configured to pass the at least one optical signal channel to an optical to electrical converter that provides the corresponding at least one electrical signal; and,
    a distortion compensator configured to electrically distort the at least one electrical signal corresponding to the optical signal channel passed by said Fabry-Perot filter to compensate for optical distortion introduced by said Fabry-Perot filter.

2. The system of claim 1, wherein said compensator is configured to electrically distort the at least one electrical signal in baseband format prior to being transmitted on the at least one optical signal channel by said at least one transmitter.

3. The system of claim 1, wherein said compensator is configured to electrically distort the at least one electrical signal as a modulated electrical carrier prior to being transmitted on the at least one optical signal channel by said at least one transmitter.

4. The system of claim 1, wherein-said compensator is configured to electrically distort the at least one electrical signal after said at least one receiver receives and converts the at least one optical signal channel passed by said Fabry-Perot filter to the at least one electrical signal.

5. The system of claim 4, wherein said at least one optical receiver is configured to coherently detect the at least one optical signal channel passed bysaid Fabry-Perot filter.

6. The system of claim 1, wherein said Fabry-Perot filter includes an optical fiber Fabry-Perot filter.

7. The system of claim 1, wherein said Fabry-Perot filter includes a wavelength tunable Fabry-Perot filter.

8. The system of claim 1, wherein said at least one transmitter includes a tunable transmitter.

9. The system of claim 1, wherein:
    said at least one transmitter includes a tunable transmitter;
    said Fabry-Perot filter includes a wavelength tunable Fabry-Perot filter; and,
    said system includes a network management system configured to control the wavelength transmitted by said at least one transmitter and filtered by said Fabry-Perot filter.

10. The system of claim 1, wherein said receiver is provided at a monitoring point along an optical link.

11. The system of claim 10, wherein said receiver is configured to monitor a plurality of optical signal channels being transmitted through said optical link.

12. The system of claim 10, wherein said receiver is configured to monitor a plurality of optical signal channels being transmitted through said optical link and provide for control of at least one optical amplifier disposed along said optical link to amplify the plurality of optical signal channels.

13. An apparatus comprising a distortion compensator configured to electrically distort an electrical signal to compensate for optical distortion introduced by a Fabry-Perot filter to an optical signal corresponding to the electrical signal.

14. The apparatus of claim 13, wherein:
    said apparatus includes an electrical to optical converter configured to convert the distorted electrical signal into a distorted optical signal and transmit the distorted optical signal to said Fabry-Perot filter; and,
    an optical receiver configured to receive the optical signal from said Fabry-Perot filter, and provide a corresponding electrical signal.

15. The apparatus of claim 13, wherein:
    said apparatus includes an optical to electrical converter configured to convert a distorted optical signal from said Fabry-Perot filter into a distorted electrical signal; and,
    said distortion compensator includes a distortion compensator configured to distort the distorted electrical signal provided by said optical to electrical converter to compensate for optical distortion introduced by said Fabry-Perot filter.

16. The apparatus of claim 15, wherein said receiver includes a coherent detection receiver.

17. A method of filtering an optical signal channel comprising:
    filtering an optical signal channel with a Fabry-Perot filter; and,
    distorting electrically an electrical signal corresponding to the optical signal channel to compensate for optical distortion introduced by the Fabry-Perot filter.

18. The method of claim 17, wherein:
    said distorting occurs before said filtering to produce a distorted electrical signal; and,
    said method includes converting the distorted electrical signal into a distorted optical signal at the optical signal channel,
    transmitting the distorted optical signal to the Fabry-Perot filter, and
    reconverting the distortion compensated optical signal into an electrical signal.

19. The method of claim 17, wherein said method includes:
    transmitting an optical signal to the Fabry-Perot filter; and
    converting a distorted optical signal channel provided by the Fabry-Perot filter into a distorted electrical signal; and,
    said distorting includes distorting electrically the distorted electrical signal to compensate for optical distortion introduced by the Fabry-Perot filter.

* * * * *